United States Patent
Ramasamy et al.

(10) Patent No.: US 8,706,110 B2
(45) Date of Patent: Apr. 22, 2014

(54) METHODS FOR SELECTING CELLS IN CELLULAR TELEPHONE SYSTEMS

(75) Inventors: Venkatasubramanian Ramasamy, San Jose, CA (US); Giri Prassad Deivasigamani, San Jose, CA (US); Srinivasan Vasudevan, Sunnyvale, CA (US); Mohit Narang, Cupertino, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 12/703,719

(22) Filed: Feb. 10, 2010

(65) Prior Publication Data

US 2011/0195713 A1  Aug. 11, 2011

(51) Int. Cl.
*H04W 4/00*  (2009.01)

(52) U.S. Cl.
USPC ...................................... 455/435.1; 455/432.1

(58) Field of Classification Search
USPC .......... 455/435.1–435.3, 422.1, 432.1–432.3, 455/436–444, 513, 550.1, 552.1, 553.1, 455/556.1, 556.2; 370/310.2, 328, 370/331–334, 338, 319–321, 324, 350
See application file for complete search history.

(56) References Cited

U.S. PATENT DOCUMENTS

| | | |
|---|---|---|
| 5,101,501 A | 3/1992 | Gilhousen et al. |
| 5,649,000 A | 7/1997 | Lee et al. |
| 5,926,762 A | 7/1999 | Arpee et al. |
| 6,002,934 A | 12/1999 | Boyer et al. |
| 6,052,583 A | 4/2000 | Bernardin |
| 6,198,925 B1 | 3/2001 | Lee |
| 6,430,200 B1 | 8/2002 | Han et al. |
| 6,763,233 B2 * | 7/2004 | Bharatia ....................... 455/433 |
| 6,961,565 B2 | 11/2005 | Tanno et al. |
| 7,013,140 B2 | 3/2006 | Osterg et al. |
| 7,299,041 B2 * | 11/2007 | Narasimha et al. ........... 455/434 |
| 7,307,975 B2 * | 12/2007 | Tyra et al. ..................... 370/335 |
| 7,437,152 B2 | 10/2008 | Ishikawa et al. |
| 7,599,335 B2 * | 10/2009 | Zalio et al. .................... 370/335 |
| 7,813,735 B2 | 10/2010 | Monfet et al. |
| 2003/0218995 A1 * | 11/2003 | Kim et al. ...................... 370/318 |
| 2003/0231605 A1 * | 12/2003 | Amerga et al. ............... 370/332 |
| 2008/0057948 A1 * | 3/2008 | Mittal et al. ............... 455/426.1 |
| 2009/0067370 A1 | 3/2009 | Kim et al. |

* cited by examiner

*Primary Examiner* — San Htun
(74) *Attorney, Agent, or Firm* — Womble Carlyle Sandridge & Rice LLP

(57) ABSTRACT

User equipment such as cellular telephones and other wireless electronic devices may communicate wirelessly with 2G and 3G cells in a cellular network. The cellular network may broadcast a list of primary scrambling codes corresponding to 3G cell sites that are potentially available for wirelessly communicating with the user equipment. The user equipment may perform an evaluation of primary scrambling code pilot signal strengths for each of the primary scrambling codes in the list. The user equipment may also maintain a record whenever a more extensive full primary scrambling code scan fails. If the evaluation reveals that at least one signal strength is sufficient, the cellular telephone may establish a corresponding 3G wireless link. If the evaluation does not identify any sufficiently strong 3G cells, a full pilot signal scan may be performed, provided that no full scans have failed within a predetermined time interval before the current time.

25 Claims, 5 Drawing Sheets

METHODS FOR SELECTING CELLS IN CELLULAR TELEPHONE SYSTEMS

BACKGROUND

This invention relates generally to wireless communications, and more particularly, ensuring that user equipment selects optimum cells with which to communicate in a cellular telephone network.

Cellular telephones and other wireless electronic devices handle voice and data communications using cellular telephone networks. Older 2G networks and newer 3G networks use different communications schemes. When both types of networks are available for supporting communications with a given user device, it is generally preferably to establish a 3G link with the device rather than a 2G link. This is because 3G networks tend to offer superior communications capabilities such as potentially higher data rates.

Cellular networks are deployed in geographic regions called cells. In a given network, each cell is used to cover a different region. For example, in a 2G network, there are numerous cells, each of which has a respective 2G base station. There is some coverage overlap to avoid dropped calls as a user transitions between cells, but each cell is essentially distinct.

So as to provide a seamless transition to newer network technologies, 3G networks are typically deployed on top of existing 2G networks. For example, heavily traveled urban corridors may be outfitted with 3G base stations to supplement 2G service. In less populated regions, 3G service may not be available. As networks build out their capacity, 3G base stations are constantly being added. Because the number and location of 3G cells in the network changes frequently, it can be difficult to keep track of the current state of the network, particularly when numerous organizations are involved in deploying and maintaining service.

Despite these difficulties, networks attempt to maintain lists of active cellular sites. For example, a network may constantly broadcast a list of nearby 3G cells that are available. User equipment that receives the broadcast list can attempt to establish a communications link with one of these 3G cells, thereby allowing the equipment to switch from 2G to 3G service. Due to the rapidly changing nature of the 3G network, however, the broadcast lists of available 3G cells may contain inaccurate information such as omitted 3G cell sites. This can make it difficult or impossible for user equipment to accurately identify available 3G cells without performing continuous frequency scans.

It would therefore be desirable to be able to provide improved techniques for identifying available cells in a network, particularly in environments that contain a mixture of different types of cells.

SUMMARY

User equipment such as cellular telephones and other wireless electronic devices may communicate wirelessly with 2G and 3G cells in a cellular network. To ensure that the user equipment identifies available 3G cells even when the cellular network does not include the 3G cells in a primary scrambling code list, the cellular telephone may, when appropriate, perform full primary scrambling code pilot signal strength scans.

During operation, the cellular network may broadcast a list of primary scrambling codes corresponding to 3G cell sites that are potentially available for wirelessly communicating with the user equipment. The user equipment may perform an evaluation of primary scrambling code pilot signal strengths for each of the primary scrambling codes in the list. For example, the user equipment may compare each signal strength to a threshold. The user equipment may also maintain a record of times at which full primary scrambling code pilot signal strength scans have failed.

If evaluation of the pilot signal strengths for the pilot signals identified in the primary scrambling code list reveals that at least one pilot signal strength is sufficient, the cellular telephone may establish a 3G wireless link with the cell that is associated with that pilot signal. If the evaluation does not identify any sufficiently strong 3G cells, a full primary scrambling code pilot signal strength scan may be performed, provided that no full scans have failed within a predetermined time interval before the current time. If it is determined that a full scan has failed within the predetermined time interval, the full scan can be inhibited to avoid wasteful scanning.

Further features of the invention, its nature and various advantages will be more apparent from the accompanying drawings and the following detailed description of the preferred embodiments.

DETAILED DESCRIPTION

This relates generally to wireless communications, and more particularly, to selecting cells during operation of user equipment in a cellular network.

User equipment may communicate with wireless networks. The user equipment may include wireless electronic devices such as laptop computers, tablet computers, or small portable computers of the type that are sometimes referred to as ultraportables. The user equipment may also include somewhat smaller devices. Examples of smaller wireless electronic devices include wrist-watch devices, pendant devices, headphone and earpiece devices, and other wearable and miniature devices. With one suitable arrangement, the user equipment may be portable electronic devices such as handheld electronic devices.

The user equipment may include media players with wireless communications capabilities, handheld computers (also sometimes called personal digital assistants), remote controllers, global positioning system (GPS) devices, handheld gaming devices, or cellular telephones. The user equipment may also include devices that combine the functionality of multiple conventional devices. An example of a hybrid device is a cellular telephone that includes media player functionality, communications functions, web browsing capabilities, and support for a variety of other business and entertainment applications such as the iPhone® cellular telephone available from Apple Inc. of Cupertino, Calif. These are merely illustrative examples of suitable user equipment that may communicate in a wireless network. In general, any suitable wireless user equipment may be used.

The wireless network in which the user equipment operates may be based on any suitable wireless technology. The geographic regions into which the wireless network is divided are typically referred to as cells, so the wireless network in which the user equipment operates is sometimes referred to as a cellular network or cellular telephone network. It will be appreciated, however, that user equipment such as portable computers and other devices that are not typically referred to as "cellular telephones" may communicate using the cellular telephone network.

Figure 1:
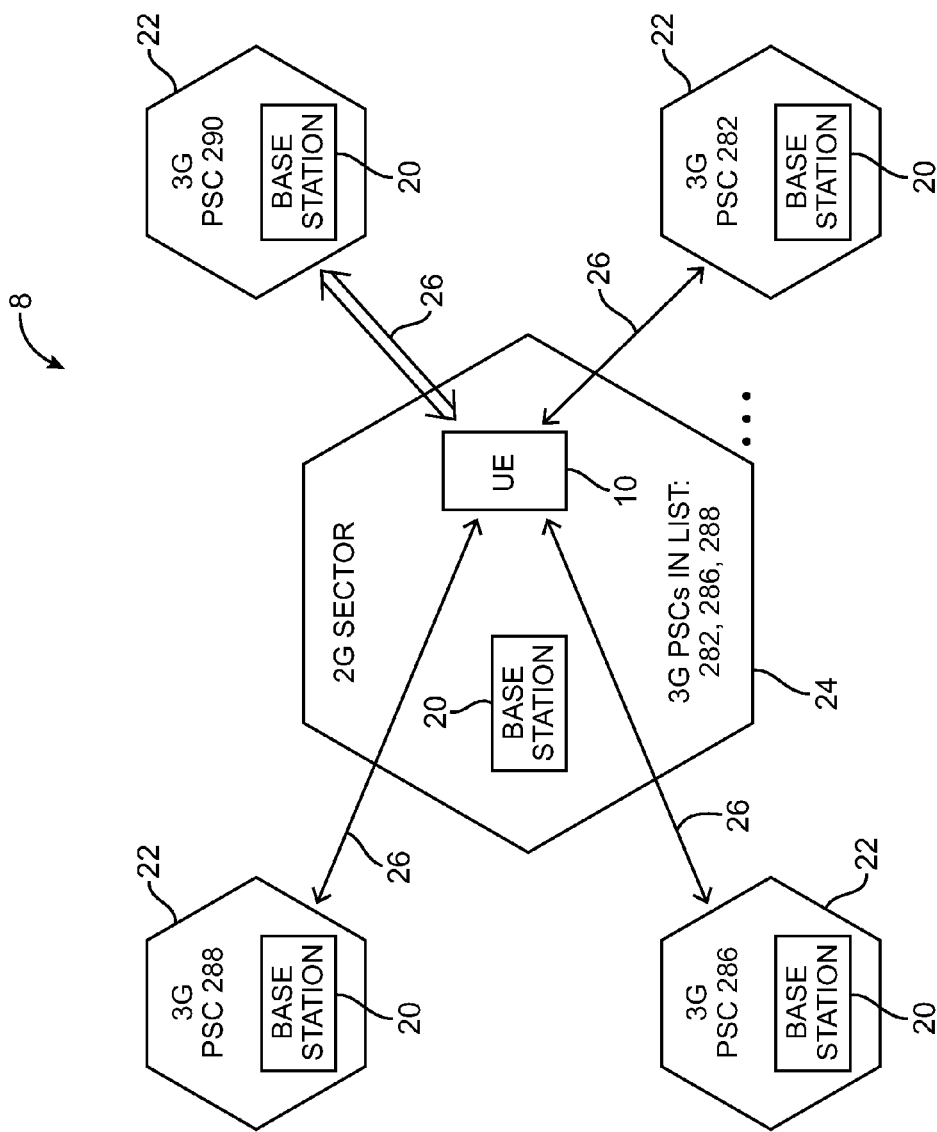
FIG. 1 is a diagram of an illustrative system in which user equipment may communicate with cellular network equipment such as 2G and 3G base stations in accordance with an embodiment of the present invention.

A diagram of a typical system environment in which user equipment is communicating with cellular network equipment in a cellular network is shown in FIG. 1. As shown in FIG. 1, cellular network system 8 may include a network of cell sites ("cells") such as cells 22 and cells 24 that are available to communicate with user equipment 10 over wireless links 26. The cells in the cellular network each have associated wireless network hardware (e.g., base stations 20). There may be different base stations for supporting different types of network protocols or, if desired, base stations may support multiple protocols. For clarity, arrangements in which there is a respective base station for each cell are described herein as an example.

In modern networks of the type shown in FIG. 1, there are a mixture of cell sites. Some of the cell sites (called "2G" sites in FIG. 1) support one type of communications protocol (typically a less capable older protocol), whereas other cells sites (called "3G" sites in FIG. 1) support a different type of communications protocol (typically a more capable newer protocol). The terms 2G and 3G are used herein for convenience and need not refer to any particular protocol. Different types of protocols (e.g., time division multiple access (TDMA), frequency hopping, code division multiplexing, wide-band code division multiple access (W-CDMA), and other technologies) may, in general, be used in a cellular network. For clarity, the use of two different cell technologies (2G and 3G) is described herein. These protocols may, for example, be a TDMA protocol and a W-CDMA protocol, respectively. These are merely examples of the types of protocols that may be used. In general, any different sets of communications protocols (e.g., two or more protocols) may be used by different cells in the network. Use of user equipment 10 in a system such as system 8 of FIG. 1 that contains two types of cells (2G and 3G) is merely an example.

During initial network deployment, 2G cells are established. As more advanced 3G equipment becomes available, 3G cells are selectively deployed. A network operator cannot typically deploy 3G cells everywhere due to cost constraints. Rather, 3G cells are added to the existing 2G infrastructure at certain locations. As more 3G coverage is added to the network, the number and location of the 3G cells constantly changes, making it difficult to keep track of available 3G cells. If 3G user equipment is unable to properly locate available 3G cells, this user equipment will be forced to communicate using a potentially slower wireless link with a 2G cell. A user of the 3G device would therefore not benefit from the 3G capabilities of the device, even though a 3G cell is within communications range.

This problem can be addressed by providing user equipment 10 with intelligent network scanning capabilities. When 3G cells are readily identified, user equipment 10 can switch from 2G to 3G service. When there is no advertised 3G service available, user equipment 10 can implement service discovery rules that make it possible to locate available 3G service without excessive scanning.

If desired, user equipment in a cellular network can perform continuous scans over the entire frequency spectrum in an attempt to continuously locate all available 3G cells. However, excessive frequency scanning with this type of arrangement can lead to rapid battery depletion and involves complex time-consuming operations. By using intelligent network scanning capabilities in user equipment 10 of FIG. 1, user equipment 10 can rapidly identify available 3G cells without over-depleting its internal battery or performing overly complex frequency scanning operations.

To avoid the inefficiencies associated with excessive frequency scanning, cellular networks typically broadcast a list of available cells. In some networks, each cell is identified by a primary scrambling code (PSC). This type of network is described herein as an example.

Consider the operation of user equipment 10 in a system environment of the type shown in FIG. 1. User equipment 10 is operating within 2G cell 24. There are a number of nearby 3G cells 22, each of which has an associated PSC. In general, there may be any suitable number of 3G cells available (e.g., no cells, one cell, two cells, more than two cells, etc.). In the FIG. 1 example, there are four 3G cells available. Each of these four cells has an associated PSC (i.e., PSC 288, PSC 286, PSC 282, and PSC 290).

In the FIG. 1 example, the user is initially operating user equipment 10 using 2G protocols. Because 3G cells are available, user equipment 10 should automatically detect which 3G cells are available. This will allow the user equipment to switch from 2G to 3G service.

In networks where cells are identified by different PSCs, the network periodically broadcasts a list of PSCs (sometimes referred to herein as a PSC list or pilot signal list). Each of the PSCs in the PSC list corresponds to a known available 3G cell. There may be a relatively large number (e.g., 512) possible PSCs in a network. The PSC list typically contains a substantially reduced subset of these possible codes. For example, at a given location, a PSC list might contain fewer than five PSCs. Because the user equipment is provided with a substantially reduced list of PSCs, it is not necessary for the user equipment to analyze the signal strength for all 512 possible PSCs in the network when evaluating how best to transition from 2G to 3G service. Rather, the user equipment can concentrate on the relatively short list of known PSCs in the PSC list.

Due to the constantly changing nature of the 3G build-out in the network, the PSC list may not be up to date. This may lead to a situation in which the user equipment is not able to connect to any 3G cell, even when a 3G cell is available. Incomplete or otherwise inaccurate PSC lists may also lead to situations in which user equipment connects to a weak 3G cell instead of a strong 3G cell.

The user equipment 10 in FIG. 1 may, for example, receive a PSC list that lists only PSC 288, PSC 282, and PSC 286 as being available. This may occur even though the 3G cell associated with PSC 290 is closer and has a stronger signal. The omission of PSC 290 from the PSC list may lead to a situation in which user equipment 10 is connected to an undesirably weak 3G cell (i.e., PSC 288, PSC 282, or PSC 286), rather than the strong cell associated with PSC 290.

Intelligent service discovery rules may be implemented in user equipment 10 to avoid this type of problem. The rules may be implemented using software (code) in the form of firmware, application code, and/or operating system code. The rules may also be implemented using hardware (e.g., custom integrated circuits that follow appropriate service discovery procedures).

Figure 2:
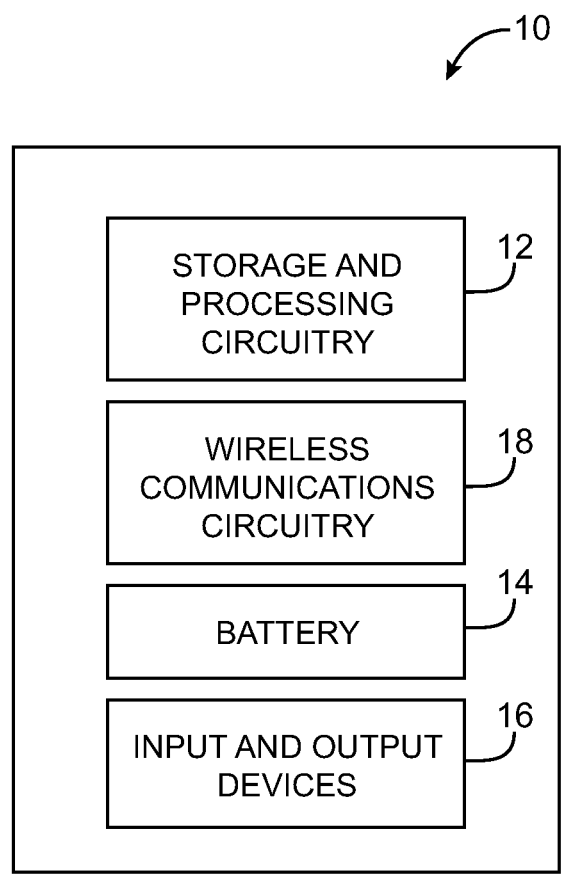
FIG. 2 is a circuit diagram of illustrative user equipment that may be used in a system environment of the type shown in FIG. 1 in accordance with an embodiment of the present invention.

A schematic diagram of an embodiment of illustrative user equipment 10 such as a cellular telephone or other electronic device is shown in FIG. 2. As shown in FIG. 1, user equipment 10 may include storage and processing circuitry 12. Storage and processing circuitry 12 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 12 may be used in controlling the operation of user equipment 10. For example, service discovery code that is stored in storage and processing circuitry 12 may be used in implementing service discovery rules that control the operation of user equipment 10. Processing circuitry in circuitry 12 may be based on processors such as microprocessors, microcontrollers, digital signal processors, dedicated processing circuits, power management circuits, audio and video chips, and other suitable integrated circuits.

With one suitable arrangement, storage and processing circuitry 12 may be used to run software on device 10 that implements operating system functions, that implements user applications (e.g., email, media playback, communications services, etc.), and that implements communications protocols (e.g., 2G and 3G protocols). The software (code) may also be used in implementing control algorithms (e.g., rules that dictate how a device that is currently only communicating using 2G protocols can efficiently identify and switch to an available 3G cell). Hardware (circuitry) in user equipment 10 may be used in implementing control algorithms and other features for equipment 10.

User equipment 10 may have one or more batteries such as battery 14. To minimize power consumption and thereby extend the life of battery 14, storage and processing circuitry 12 may be used in implementing power management functions for user equipment 10.

Input-output devices 16 may be used to allow data to be supplied to user equipment 10 and to allow data to be provided from user equipment 10 to external devices. Examples of input-output devices 16 that may be used in user equipment 10 include display screens such as touch screens (e.g., liquid crystal displays, organic light-emitting diode displays, electronic ink displays, etc.), buttons, joysticks, click wheels, scrolling wheels, touch pads, key pads, keyboards, microphones, speakers and other devices for creating sound, cameras, sensors, etc. A user can control the operation of user equipment 10 by supplying commands through devices 16. Devices 16 may also be used to convey visual or sonic information to the user of user equipment 10. Devices 16 may include connectors for forming data ports (e.g., for attaching external equipment such as computers, accessories, etc.).

Wireless communications devices 18 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Storage and processing circuitry 12 may control wireless communications circuitry 18. For example, storage and processing circuitry 12 may be used to store PSC lists that are received from a cellular network. Storage and processing circuitry 12 may also be used to analyze detected PSC pilot signals and, when appropriate, may be used to perform extended (e.g., full) scans to identify PSCs for additional available 3G cells (as an example). Storage and processing circuitry 12 may communicate with a cellular network using wireless communications circuitry 18.

User equipment 10 can communicate with external devices such as accessories, computing equipment, and wireless networks over wired and wireless communications paths.

For example, accessories such as wired or wireless headsets may communicate with user equipment 10. User equipment 10 may also be connected to audio-video equipment (e.g., wireless speakers, a game controller, or other equipment that receives and plays audio and video content), or a peripheral such as a wireless printer or camera.

User equipment 10 may use a wired or wireless path to communicate with a personal computer or other computing equipment. The computing equipment may be, for example, a computer that has an associated wireless access point (router) or an internal or external wireless card that establishes a wireless connection with user equipment 10. The computer may be a server (e.g., an internet server), a local area network computer with or without internet access, a user's own personal computer, a peer device (e.g., another user device), or any other suitable computing equipment.

User equipment 10 can also communicate with wireless network equipment, such as cellular telephone base stations 20 (FIG. 1). In a typical scenario, the cellular network (e.g., base station equipment) broadcasts a PSC list that identifies each available 3G cell to user equipment 10. User equipment 10 can then evaluate the signal strength of each identified cell. Each 3G cell broadcasts a respective PSC pilot signal. User equipment 10 can evaluate the signal strength for each pilot signal. Any suitable technique may be used in evaluating PSC pilot signal strength. For example, pilot signal strength can be evaluated by evaluating incoming signals to ascertain a Received Signal Strength Indicator (RSSI) value. The value of RSSI is a function of Received Signal Code Power (RSCP) and the ratio of received energy to interference level Ec/Io. One or more parameters such as these or other suitable measured signal characteristics may be used by user equipment 10 to evaluate the strength of the PSC pilot signal for each PSC in the broadcast PSC list.

Signal processing techniques may be used to enhance the accuracy of the PSC pilot signal strength measurements. For example, a moving average of signal strength may be maintained for each PSC pilot signal to ensure that the PSC pilot signal strength is accurate. The moving average may be computed by averaging a current PSC pilot signal strength measurement with one, two, three, or more than three preceding pilot signal strength measurements.

Figure 3:
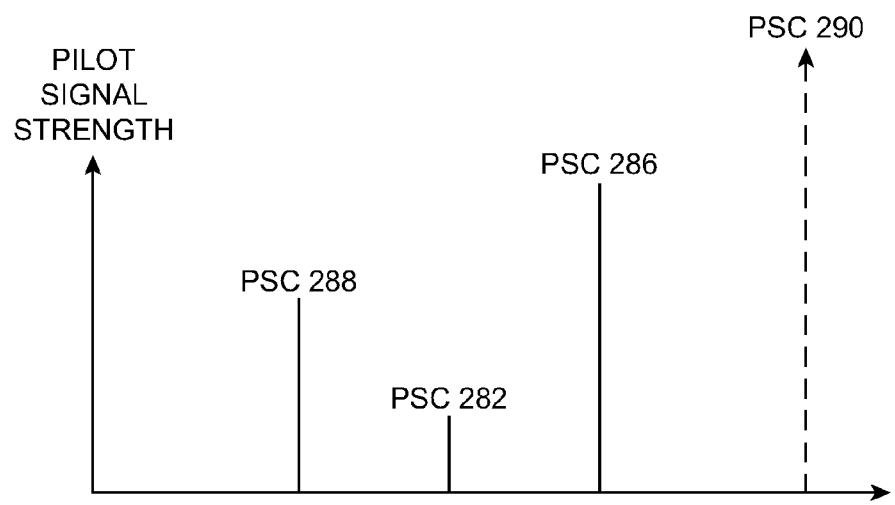
FIG. 3 is a graph showing how user equipment may detect primary scrambling code (PSC) pilot signals of different strengths each of which corresponds to a different available base station in accordance with an embodiment of the present invention.

FIG. 3 is a graph showing how the PSC pilot signal strength in the cellular network of FIG. 1 may be different for each of the PSCs in the broadcast PSC list (e.g., PSC 288, PSC 282, and PSC 286). Because (in the present example), the broadcast PSC list does not contain an entry for PSC 290, the strong signal that is associated with 3G cell PSC 290 is not initially evaluated.

Figure 4:
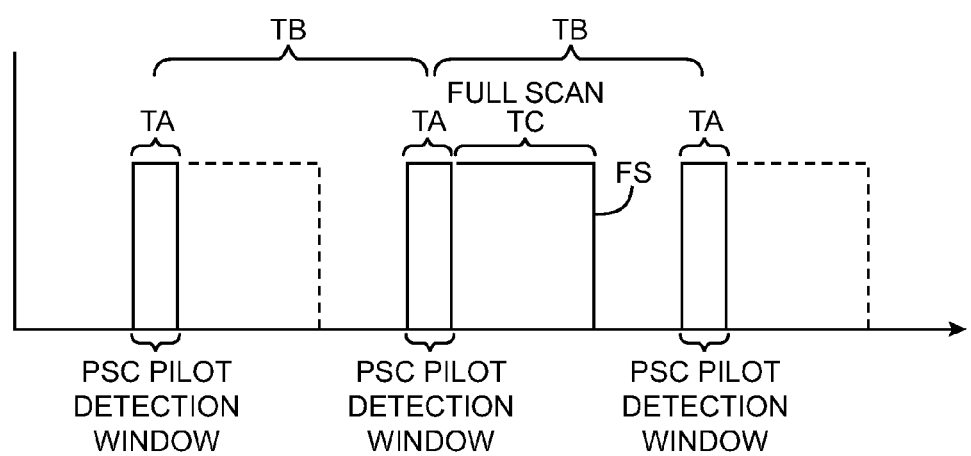
FIG. 4 is a graph showing how user equipment may use a list of available base stations to perform pilot signal detection operations during periodic PSC pilot detection windows and may perform a full pilot signal detection operation to detect unlisted but available base stations if appropriate criteria are satisfied in accordance with an embodiment of the present invention.

Evaluation of the PSC pilot signal strengths in the PSC list may take place during a time period that is sometimes referred to as a PSC pilot detection window. The PSC pilot detection window (and its associated list-based PSC pilot signal strength evaluation operations) may be repeated at a regular time interval TB that is established by the cellular network, as shown in FIG. 4. The duration of the PSC pilot detection window (TA) is typically significantly less than the period TB.

If the user equipment were to restrict its PSC pilot signal strength evaluation operations to only those PSCs that are contained in the broadcast PSC list, the user equipment would miss opportunities to connect to strong 3G cells that are inadvertently not included in the PSC list (i.e., PSC 290 in the FIG. 1 example). Accordingly, user equipment 10 preferably performs more extensive pilot signal strength scans when appropriate. This scan may involve rescanning the entries in the PSC list and scanning through the remainder of the 512 PSC values (i.e., the PSC values that are not contained in the broadcast PSC list) or other suitable set of PSC values. Because the more extensive scan can be used to examine all PSC values, this type of scan is sometimes referred to herein as a full scan.

The operations involved in performing a full scan generally take significantly more time (i.e., duration TC) than the operations involved in performing a scan that only covers the PSC entries in the PSC list (i.e., duration TA). To ensure that the full scan is not performed more than necessary, service discovery rules may establish a set of full scan criteria. With this type of arrangement, user equipment 10 will only perform a full scan when all of the full scan criteria have been satisfied.

As indicated schematically by the dashed lines in FIG. 4, the full scan criteria may be chosen so that full scans will often be inhibited (not performed). Selectively omitting full scans in this way may help ensure that user equipment 10 is not overly burdened by performing complex full scans, particularly when the user is located in an environment where repeated full scan failures are likely. This may help to reduce the processing burden on user equipment 10 and may help to reduce power consumption.

Any suitable service discovery algorithm may be used to determine when to perform full PSC scans. For example, full PSC scans may only be initiated under direct control of a user (e.g., when a user clicks on an on-screen option). As another example, full scans may be performed according to a particular interval (e.g., once every ten periods TB). More preferably, however, full scans (or other such extended scans) may be performed when the PSC list is empty or when the PSC list only identifies 3G cells of inferior quality.

To avoid situations in which full scans are performed too often (even when the PSC list is empty or when the nearby 3G cells are of poor quality), repetitive full scans can be inhibited. For example, a service discovery algorithm may be implemented on user equipment 10 that instructs user equipment 10 to forego full scans whenever a full scan has recently been performed but has failed. The period of time following a failed full scan during which subsequent full scans are inhibited may be, for example, 30 seconds or other suitable time interval. Because no full scans are performed during this interval, this interval may sometimes be referred to as a full scan blanking interval. The length of the full scan blanking interval may be 30 seconds or less, 15 seconds or less, 1-60 seconds, more than 60 seconds, or may have other suitable values. Short blanking interval lengths ensure that user equipment 10 will be able to respond quickly to network changes. Use of longer full scan blanking interval values will help to reduce the frequency of full scans, thereby preventing unnecessary full scans and conserving power.

Figure 5:
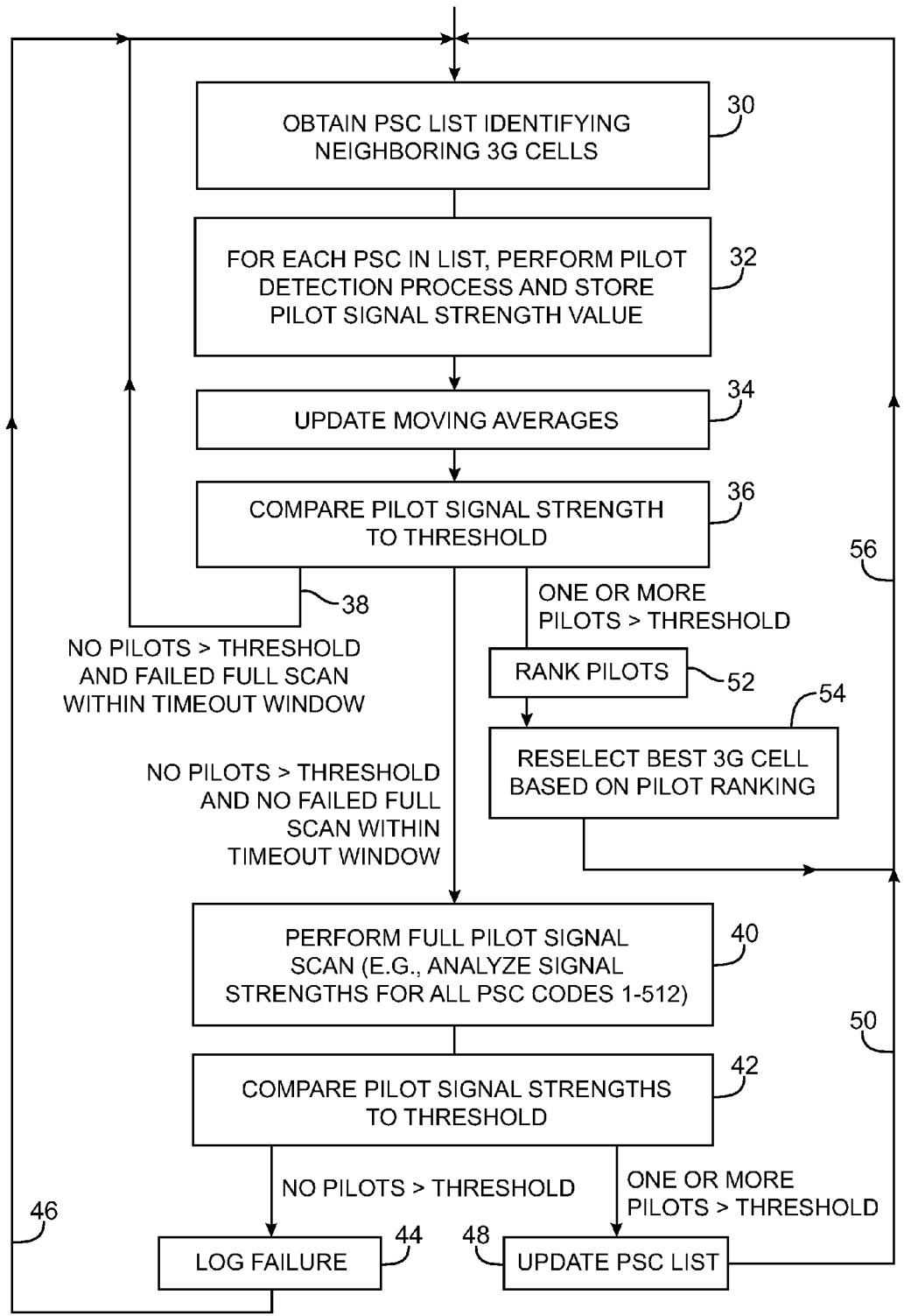
FIG. 5 is a flow chart of illustrative steps involved in operating user equipment of the type shown in FIG. 2 in a network environment of the type shown in FIG. 1 in accordance with an embodiment of the present invention.

Illustrative steps involved in operating user equipment 10 in a system such as system 8 of FIG. 1 are shown in FIG. 5.

At step 30, user equipment 10 may obtain the current PSC list. The PSC list is broadcast by the cellular network. User equipment 10 receives the PSC list using wireless communications circuitry 18. The PSC list may be stored in storage within storage and processing circuitry 12. The PSC list contains a list of 3G base stations that are known to be in the vicinity of the user equipment. The PSC entries in the list therefore serve as a list of cellular base stations for 3G cells that are potentially available for supporting wireless communications with the user equipment.

At step 32, user equipment 10 makes PSC pilot signal strength measurements. For example, user equipment 10 uses wireless communications circuitry 18 to gather strength data for each of the PSC pilot signals (see, e.g., the graph of FIG. 3). The PSC pilot signal strength measurements may be stored in storage and processing circuitry 12.

If desired, moving average techniques or other data smoothing techniques may be used in processing the PSC pilot signal strength data (step 34). For example, storage and processing circuitry 12 may maintain a table of recent PSC pilot signal strength measurements. The table may contain data for the last N PSC pilot signal strength measurements for each PSC in the broadcast PSC list. The value of N may be, for example 1, 2, 3, 4, 5, less than 5, 6-10, 10 or less, more than 10, etc. During the operations of step 34, the average value of the most recent N measurements (or the most recent M measurements where M is less than N) may be computed. This value may be used to represent the measured PSC pilot signal strength value for each PSC in the broadcast PSC list.

At step 36, the PSC pilot signal strengths can be evaluated to determine whether any of the 3G cells in the PSC list is sufficiently strong to support a wireless link with user equipment 10. For example, the PSC pilot signal strength values can be compared to a predetermined threshold value. If the signal strength of at least one of the PSC pilot signals is above the threshold, user equipment 10 can rank the PSC pilot signals in order of their measured strengths (step 52). The highest-strength PSC pilot may then be used to identify which 3G cell the user equipment should be connected to. In particular, during the operations of step 54, user equipment 10 can establish a 3G wireless link with the strongest 3G cell (i.e., the 3G cell having the PSC that corresponds to the strongest measured PSC pilot signal). Following selection of the strongest 3G cell in the broadcast PSC list, processing may loop back to step 30, as indicated by line 56. This portion of the FIG. 5 process corresponds to the PSC pilot detection windows (of duration TA) in the diagram of FIG. 4. So long as the PSC list contains at least one 3G cell of sufficient strength, processing can continue in this way indefinitely.

If, however, the comparison operation of step 36 indicates that no PSC pilot signals had a strength greater than the predetermined threshold, a more extensive scan may be performed at step 40, provided that user equipment 10 is not currently within the full scan blanking interval described in connection with FIG. 4. The full scan, which corresponds to full scan FS of duration TC in FIG. 4, allows user equipment 10 to discover 3G cells that are not contained in the PSC list. During the full pilot signal scan, the strength of the pilot signal for each of the available PSCs (e.g., 1-512) may be measured.

At step 42, each of the measured pilot signal strengths from step 40 may be compared to the predetermined pilot signal strength threshold.

If, during the operations of step 42, it is determined that one or more PSC pilot signals has a signal strength that is greater than the predetermined threshold, the PSC list may be updated at step 48 (e.g., by providing information to the cellular network and/or by updating the PSC list in user equipment 20). Processing may then loop back to step 30, as indicated by line 50, so that equipment 10 may connect to the best available 3G cell.

If, during the operations of step 42, it is determined that no PSC pilot signals have a signal strength that is greater than the predetermined threshold, a failure log indicating the time of the failure may be updated in storage and processing circuitry 12 (step 44). Processing may then loop back to step 30, as indicated by step 46. By storing information on the time of the full scan failure, user equipment 10 can begin timing the duration of the full scan blanking interval. Subsequent full scans can be inhibited during the full scan blanking interval to avoid performing an excessive number of scanning operations.

Consider, as an example, a situation in which a full scan is performed starting at time t=0 seconds. The scan takes duration TC. Duration TC is longer than the duration TA of the PSC pilot detection window, because more pilot signal strengths (e.g., hundreds of times more) are generally evaluated during the full scan, than are involved when evaluating the relatively short list of PSC entries in the PSC list. If the scan fails, information on the time at which the full scan was performed (e.g., time t=0 seconds in this example) is maintained in storage (e.g., in a failure log).

If subsequently, during the operations of step 36, it is determined that no pilots have signal strengths that are greater than the predetermined threshold, user equipment 10 can ascertain the amount of time that has elapsed since the full scan failure. With this information, the user equipment may then determine whether or not the user equipment is currently operating within the full scan blanking interval. If the value of time t during the operations of step 36 is, for example, t=15 seconds and if the full scan blanking interval has a size of 30 seconds, the current time will fall within the full scan blanking interval. In this situation, the full scan process can be skipped (inhibited) and processing can return directly to step 30, as indicated by line 38 of FIG. 5.

The foregoing is merely illustrative of the principles of this invention and various modifications can be made by those skilled in the art without departing from the scope and spirit of the invention.

What is claimed is:

1. A method for operating a cellular telephone in a cellular network having second generation (2G) and third generation (3G) cells, comprising:
    while wirelessly connected to a 2G cell, obtaining a primary scrambling code list broadcast by the cellular network using the cellular telephone, wherein the primary scrambling code list includes primary scrambling codes corresponding to 3G cells in the cellular network that are potentially available to wirelessly communicate with the cellular telephone and includes less than all possible primary scrambling codes;
    performing an evaluation of primary scrambling code pilot signal strengths for each of the primary scrambling codes in the primary scrambling code list by using the cellular telephone to compare the primary scrambling code pilot signal strengths for each of the primary scrambling codes in the primary scrambling code list to a threshold signal strength;
    determining whether a prior full primary scrambling code pilot signal strength scan associated with the evaluation of the primary scrambling code pilot signal strengths for each of the primary scrambling codes in the primary scrambling code list and for at least one primary scrambling code not included in the primary scrambling code list has failed within a predetermined time interval before a current time;
    in response to determining that at least one of the primary scrambling code pilot signal strengths exceeds the threshold signal strength, establishing wireless communications between the cellular telephone and a 3G cell corresponding to one of the primary scrambling code pilot signal strengths that exceeds the threshold signal strength without performing a full primary scrambling code pilot signal strength scan;
    in response to determining that none of the primary scrambling code pilot signal strengths exceeds the threshold signal strength and that no prior full primary scrambling code pilot signal strength scans have failed within the predetermined time interval, performing a full primary scrambling code pilot signal strength scan; and
    in response to determining that none of the primary scrambling code pilot signal strengths exceeds the threshold signal strength and that at least one full primary scrambling code pilot signal strength scan has failed within the predetermined time interval, inhibiting performance of a subsequent full primary scrambling code pilot signal strength scan.

2. The method defined in claim 1, further comprising after performing the full primary scrambling code pilot signal strength scan in response to determining that none of the primary scrambling code pilot signal strengths exceeds the threshold signal strength and that no prior full primary scrambling code pilot signal strength scans have failed within the predetermined time interval, comparing pilot signal strength measurements obtained during the full primary scrambling code pilot signal strength scan to at least one threshold.

3. The method defined in claim 2, wherein when comparing the pilot signal strength measurements obtained during the full primary scrambling code pilot signal strength scan to the at least one threshold reveals that each of the pilot signal strength measurements obtained during the full primary scrambling code pilot signal strength scan is less than the at least one threshold, logging a failure of the full primary scrambling code pilot signal strength scan in response.

4. The method defined in claim 3, wherein logging the failure of the full primary scrambling code pilot signal strength scan comprises storing a failure time in a failure log in the cellular telephone.

5. The method defined in claim 1, wherein performing the evaluation of primary scrambling code pilot signal strengths further comprises determining at least one moving average for at least one of the primary scrambling codes in the primary scrambling code list.

6. The method defined in claim 1, wherein performing the evaluation of primary scrambling code pilot signal strengths further comprises maintaining a table of measured primary scrambling code pilot signal strengths for each of the primary scrambling codes in the primary scrambling code list.

7. The method defined in claim 6, wherein performing the evaluation of primary scrambling code pilot signal strengths further comprises averaging a plurality of the measured primary scrambling code pilot signal strengths in the table.

8. The method defined in claim 7, wherein averaging the plurality of measured primary scrambling code pilot signal strengths in the table comprises computing a moving average for each of the primary scrambling codes in the primary scrambling code list.

9. A method for operating a user equipment in a cellular network, comprising:
- with the user equipment, obtaining a primary scrambling code list that has been wirelessly broadcast from the cellular network, wherein the primary scrambling code list comprises primary scrambling codes corresponding to cells of the cellular network that are potentially available to wirelessly communicate with the user equipment and comprises less than all possible primary scrambling codes; and
- with the user equipment, evaluating at least one primary scrambling code pilot signal strength for each of the primary scrambling codes in the primary scrambling code list;
- with the user equipment, comparing the at least one evaluated primary scrambling code pilot signal strength for each of the primary scrambling codes in the primary scrambling code list to a threshold signal strength;
- with the user equipment, determining whether a previous full primary scrambling code pilot signal strength scan associated with the evaluation of the primary scrambling code pilot signal strengths for each of the primary scrambling codes in the primary scrambling code list and for at least one primary scrambling code not included in the primary scrambling code list failed within a predetermined time before a current time; and
- when (i) none of the evaluated primary scrambling code pilot signal strengths exceeds the threshold signal strength, and (ii) the previous full primary scrambling code pilot signal strength scan has failed within the predetermined time, inhibiting, by the user equipment, additional full primary scrambling code pilot signal strength scans.

10. The method defined in claim 9, wherein when (i) none of the evaluated primary scrambling code pilot signal strengths exceeds the threshold signal strength, or (ii) the previous full primary scrambling code pilot signal strength scan did not fail within the predetermined time before the current time, performing an additional full primary scrambling code pilot signal strength scan with the user equipment.

11. The method defined in claim 10, further comprising, in response to performing the additional full primary scrambling code pilot signal strength scan, comparing measured signal strengths from the performed additional full primary scrambling code pilot signal strength scan to at least one threshold.

12. The method defined in claim 11, further comprising, when none of the measured signal strengths from the performed additional full primary scrambling code pilot signal strength scan exceed the at least one threshold, updating a failure log with a failure time.

13. The method defined in claim 12, wherein determining whether a previous full primary scrambling code pilot signal strength scan failed within a predetermined time before a current time comprises identifying the failure time in the failure log.

14. The method defined in claim 12, further comprising, when at least one of the measured signal strengths from the performed additional full primary scrambling code pilot signal strength scan exceeds the at least one threshold, updating, with the user equipment, the primary scrambling code list on the cellular network.

15. The method defined in claim 10, further comprising when at least one of the evaluated primary scrambling code pilot signal strengths exceeds the threshold signal strength, reselecting, by the user equipment, a cell corresponding to a pilot signal having a signal strength that exceeds the threshold signal strength.

16. The method defined in claim 10, further comprising:
- with the user equipment, maintaining a data structure of previous evaluations of primary scrambling code pilot signal strengths for each primary scrambling code in the primary scrambling code list correlated with the evaluated primary scrambling code pilot signal strengths for each of the primary scrambling codes in the primary scrambling code list; and
- computing an average signal strength of each primary scrambling code in the primary scrambling code list based on the maintained data structure of previous evaluations of primary scrambling code pilot signal strengths;
- wherein comparing the evaluated primary scrambling code pilot signal strengths for each of the primary scrambling codes in the primary scrambling code list to the threshold signal strength comprises comparing the average signal strength of each of the primary scrambling codes in the primary scrambling code list to the threshold signal strength.

17. A mobile device, comprising:
- wireless communications circuitry configured to communicate with a cellular network;
- processing circuitry coupled to the wireless communications circuitry; and
- a non-transitory computer-readable medium comprising one or more instructions which are configured to, when executed by the processing circuitry, cause the mobile device to:
  - obtain a primary scrambling code list that is wirelessly broadcast by the cellular network, wherein the primary scrambling code list comprises primary scrambling codes corresponding to cells in the cellular network that are potentially available to wirelessly communicate with the mobile device and includes less than all possible primary scrambling codes;
  - perform an evaluation of primary scrambling code pilot signal strengths for each of the primary scrambling codes in the primary scrambling code list by comparing a primary scrambling code pilot signal strength for each of the primary scrambling codes in the primary scrambling code list to a threshold signal strength; and
  - when the evaluation reveals that all of the primary scrambling code pilot signal strengths for each of the primary scrambling codes in the primary scrambling code list are less than the threshold signal strength, and when no full primary scrambling code pilot signal strength scans have failed within a predetermined full scan blanking interval before a current time, perform a full primary scrambling code pilot signal strength scan for all possible primary scrambling codes.

18. The mobile device defined in claim 17, wherein the one or more instructions are further configured to, when executed by the processing circuitry, cause the mobile device to:
- compare pilot signal strength measurements obtained during the full primary scrambling code pilot signal strength scan to the threshold signal strength; and
- when the comparison reveals that none of the pilot signal strength measurements are greater than the threshold signal strength, log a failure of the full primary scrambling code pilot signal strength scan with the current time of the failure to a failure log.

19. The mobile device defined in claim 18, wherein the one or more instructions are further configured to, when executed by the processing circuitry, cause the mobile device to update the primary scrambling code list with the one or more pilot signal strength measurements, when the comparison reveals that one or more of the pilot signal strength measurements are greater than the threshold signal strength.

20. The mobile device defined in claim 19, wherein the one or more instructions are further configured to, when executed by the processing circuitry, cause the mobile device to:
when the evaluation reveals that all of the primary scrambling code pilot signal strengths for each of the primary scrambling codes in the primary scrambling code list are less than the threshold signal strength and the failure log indicates a previous full primary scrambling code pilot signal strength scan has failed within the predetermined full scan blanking interval before the current time, inhibit performance of a subsequent full primary scrambling code pilot signal strength scan during the predetermined full scan blanking interval.

21. The mobile device defined in claim 20, wherein the one or more instructions are further configured to, when executed by the processing circuitry, cause the mobile device to:
when the evaluation of primary scrambling code pilot signal strengths reveals that at least one of the primary scrambling code pilot signal strengths in the primary scrambling code list exceeds the threshold signal strength, reselect to a new cell that corresponds to one of the at least one of the primary scrambling code pilot signal strengths that exceeds the threshold signal strength.

22. The mobile device defined in claim 21, wherein the one or more instructions are further configured to, when executed by the processing circuitry, cause the mobile device to:
when the evaluation of primary scrambling code pilot signal strengths reveals that at least one of the primary scrambling code pilot signal strengths in the primary scrambling code list exceeds the threshold signal strength, rank the primary scrambling codes in the primary scrambling code list in order of the corresponding evaluated primary scrambling code pilot signal strength;
wherein reselection to the new cell is based on the ranked primary scrambling codes.

23. A method for operating a cellular telephone in a cellular network having second generation (2G) and third generation (3G) cells, comprising:
while wirelessly connected to a 2G cell, obtaining a primary scrambling code list from the cellular network with the cellular telephone, wherein the primary scrambling code list includes primary scrambling codes corresponding to 3G cells in the cellular network that are potentially available to wirelessly communicate with the cellular telephone;
performing an evaluation of primary scrambling code pilot signal strengths for each of the primary scrambling codes in the primary scrambling code list by using the cellular telephone to compare the primary scrambling code pilot signal strength for each of the primary scrambling codes in the primary scrambling code list to a threshold signal strength; and
determining whether a prior full primary scrambling code pilot signal strength scan associated with the evaluation of the primary scrambling code pilot signal strengths for each of the primary scrambling codes in the primary scrambling code list has failed within a predetermined time interval before a current time based on a failure time stored in a failure log;
in response to determining that at least one of the primary scrambling code pilot signal strengths exceeds the threshold signal strength, establishing wireless communications between the cellular telephone and a 3G cell corresponding to one of the primary scrambling code pilot signal strengths that exceeds the threshold signal strength;
in response to determining that none of the primary scrambling code pilot signal strengths exceeds the threshold signal strength and that no prior full primary scrambling code pilot signal strength scans have failed within the predetermined time interval, performing a full primary scrambling code pilot signal strength scan;
after performing the full primary scrambling code pilot signal strength scan, comparing pilot signal strength measurements obtained during the full primary scrambling code pilot signal strength scan to at least one threshold;
when comparing the pilot signal strength measurements obtained during the full primary scrambling code pilot signal strength scan to the at least one threshold reveals that each of the pilot signal strength measurements obtained during the full primary scrambling code pilot signal strength scan is less than the at least one threshold, logging a failure of the full primary scrambling code pilot signal strength scan by storing a corresponding failure time in the failure log in the cellular telephone; and
in response to determining that none of the primary scrambling code pilot signal strengths exceed the threshold signal strength and that at least one full primary scrambling code pilot signal strength scan has failed within the predetermined time interval, inhibiting performance of a subsequent full primary scrambling code pilot signal strength scan.

24. The method defined in claim 23, wherein performing the evaluation of primary scrambling code pilot signal strengths further comprises:
computing at least one moving average of primary scrambling code pilot signal strengths for each of the primary scrambling codes in the primary scrambling code list; and
comparing the at least one moving average to the threshold signal strength.

25. The method defined in claim 23, wherein establishing wireless communications between the cellular telephone and the 3G cell corresponding to one of the primary scrambling code pilot signal strengths that exceeds the threshold signal strength comprises:
ranking 3G cells based on the evaluated primary scrambling code pilot signal strengths; and
establishing wireless communications based on the ranking.

* * * * *